US005907468A

United States Patent [19]
Muz

[11] Patent Number: 5,907,468
[45] Date of Patent: May 25, 1999

[54] DEVICE FOR APPLYING UNIPOLAR ELECTRICAL CHARGES TO A MOVING ELECTRICALLY-INSULATED SURFACE USING A CORONA ELECTRODE

[75] Inventor: Edwin Muz, Reutlingen, Germany

[73] Assignee: Haug GmbH & Co. KG, Leinfelden-Echterdingen, Germany

[21] Appl. No.: 08/844,247

[22] Filed: Apr. 18, 1997

Related U.S. Application Data

[63] Continuation of application No. PCT/EP95/04043, Oct. 14, 1995.

[30] Foreign Application Priority Data

Oct. 19, 1994 [DE] Germany ............................ 44 37 305
Jun. 2, 1995 [DE] Germany ............................ 195 20 260

[51] Int. Cl.$^{6}$ ............................ H02H 1/00
[52] U.S. Cl. ............................ 361/213; 361/229; 361/230
[58] Field of Search ............................ 361/212–214, 361/225, 229–231, 235; 250/324–326; 399/170–173

[56] References Cited

U.S. PATENT DOCUMENTS

| | | | |
|---|---|---|---|
| 3,744,898 | 7/1973 | Kurahashi et al. | 399/153 |
| 4,048,667 | 9/1977 | Brennecke | 361/213 |
| 4,053,769 | 10/1977 | Nishikawa et al. | 250/324 |
| 4,547,129 | 10/1985 | Endo | 417/48 |
| 4,585,323 | 4/1986 | Ewing et al. | 355/3 |
| 5,101,107 | 3/1992 | Stoot | 250/324 |
| 5,307,234 | 4/1994 | Homolka | 361/229 |
| 5,517,384 | 5/1996 | Hahne et al. | 361/230 |

FOREIGN PATENT DOCUMENTS

| | | |
|---|---|---|
| 0 147 985 | 7/1985 | European Pat. Off. . |
| 40 16 997 | 8/1991 | Germany . |

*Primary Examiner*—Jeffrey Gaffin
*Assistant Examiner*—Kim N. Huynh
*Attorney, Agent, or Firm*—Barry R. Lipsitz; Ralph F. Hoppin

[57] ABSTRACT

A device for applying unipolar electrical charges to a moving, essentially electrically conductive insulating surface. An elongated corona electrode, e.g., including a number of tip electrodes, along with one or more auxiliary electrodes, and an electrically conductive counter electrode, are provided. The counter electrode supports the insulating surface, and a high-voltage d.c. source is connected to the electrodes. A carrier made of electrically insulating material is provided in the form of a channel, including a bottom wall and two side walls. The free edges of the side walls face the counter electrode. The corona electrode is arranged in the channel and at the bottom wall, and does not project over the free edges of the side walls. The auxiliary electrode(s) is arranged at, or in the vicinity of, each edge of the side walls, between the corona electrode and the counter electrode. One pole of the high-voltage d.c. source is connected to the corona electrode, and the other pole is connected to the counter and auxiliary electrode(s). An ohmic resistor is connected between the other pole of the high-voltage d.c. source and the auxiliary electrodes.

15 Claims, 3 Drawing Sheets

DEVICE FOR APPLYING UNIPOLAR ELECTRICAL CHARGES TO A MOVING ELECTRICALLY-INSULATED SURFACE USING A CORONA ELECTRODE

This application is a continuation of International PCT Application No. PCT/EP95/04043, filed on Oct. 14, 1995.

BACKGROUND OF THE INVENTION

The invention relates to a device for applying unipolar electrical charges by means of an elongated corona electrode with at least one auxiliary electrode to moving, essentially electrically insulating surfaces supported on an electrically conductive counter electrode, and with a high-voltage d.c. source connected to the electrodes.

A device of this kind is known from DE 24 10 479 C3. In the known device, the corona electrode is enclosed and screened by an auxiliary electrode over an angular area of approximately 270°, and the edges of the auxiliary electrode which are of decisive importance for the field generation and the tips of the corona electrode are spaced at the same distance from the surface to be charged. The auxiliary electrode is directly connected to ground, to which also the one pole of a high-voltage d.c. source is connected, the other pole of which is connected to the corona electrode.

In the known device, opposing electric fields can easily develop due to the occurrence of an interfering charge, and these can disturb the field directed from the corona electrode towards the surface to be charged and hence the applying of a unipolar electrical charge. In particular, in the case of tip electrodes, there can also be uneven charge distributions on the surface to be charged and the tip electrodes can, so to speak, be "reproduced" in the form of stripes on the moved surface to be charged.

SUMMARY OF THE INVENTION

The object of the invention is to so design a generic device that an undisturbed, uniform charging of the surface, independently of the geometrical shape of the corona electrode, is possible.

The object is accomplished with the generic device in accordance with the invention in that a) a carrier made of electrically insulating material is provided in the form of a channel with a bottom wall and two side walls, with the free edges of the side walls facing the counter electrode;

b) the corona electrode is arranged in the channel and at the bottom wall without projecting over the free edges of the side walls;

c) at least one auxiliary electrode is arranged at or in the vicinity of each edge of the side walls between corona electrode and counter electrode;

d) the corona electrode is connected to the one and the counter and auxiliary electrodes to the other pole of the high-voltage d.c. source; and e) an ohmic resistor is connected between the other pole of the high-voltage d.c. source and the auxiliary electrodes.

The following description of preferred embodiments of the invention serves in conjunction with the appended drawings to explain the invention in greater detail.

Figure 1:
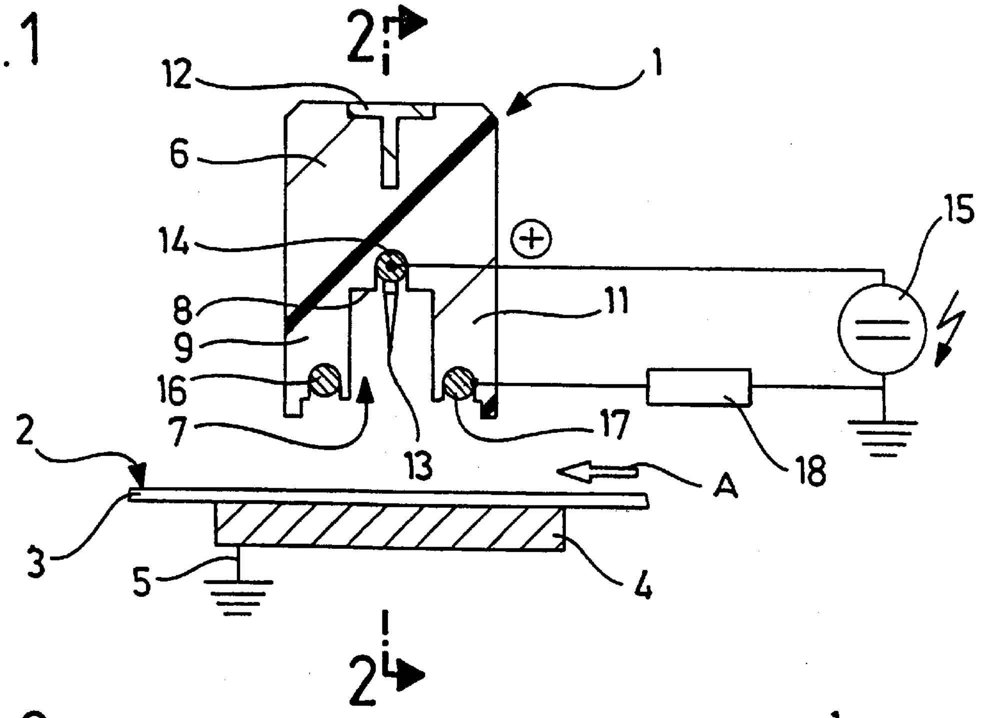
FIG. 1 schematically a charging bar for applying unipolar electrical charges to an advanced, essentially electrically insulating surface.
Figure 2:
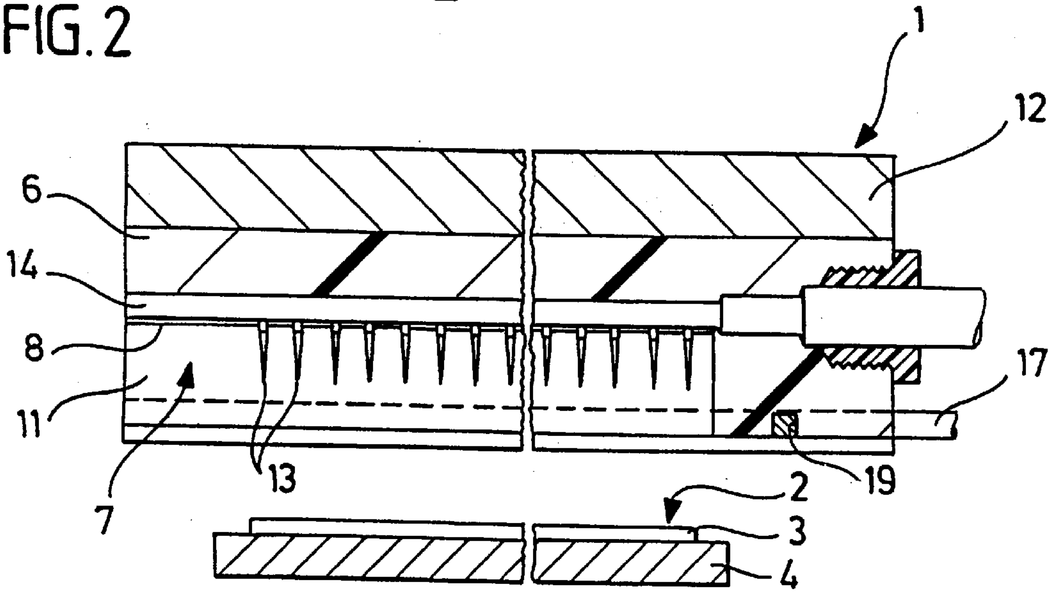
FIG. 2 a schematic sectional view along line 2—2 in FIG. 1.

Illustrated in FIGS. 1 and 2 is a device in the form of an elongated charging bar 1 for applying unipolar electrical charges to an essentially electrically insulating surface 2 advanced in the direction of arrow A, for example, a plastic film web 3. The charging bar 1 extends transversely to the direction of advance A over the entire surface 2. In the area of the charging bar 1, there is arranged underneath the web 3 a stationary, electrically conducting counter electrode 4 made, for example, of metal, and preferably having a large surface area. The web 3 slides over the counter electrode 4 which is connected at 5 to ground or zero potential.

The charging bar 1 comprises a carrier 6 made of electrically insulating material, for example, plastic, in the form of a channel 7 with a bottom wall 8 and two side walls 9, 11, with the free edges of the side walls facing the counter electrode 4. The carrier 6 may be of considerable length, for example, up to two or more meters, and it is appropriately reinforced to prevent deformation by a rigid, shaped section 12 which is made of metal and is inserted in the plastic.

Arranged in the channel 7 and at its bottom wall 8 is a corona electrode in the form of mutually spaced tips 13 which are electrically connected to one another. The electrical connection of the tips 13 is made via a common, wire-shaped conductor 14 which is connected to the one pole, for example, the positive pole, of a high-voltage d.c. source 15. As illustrated, the tips 13 terminate before the free edges of the side walls 9, 11 of the channel 7. They thus do not project over these edges but lie—viewed from the counter electrode 4—at a considerable distance behind the free edges of the side walls 9, 11 and hence also behind two auxiliary electrodes 16, 17, which are arranged at the free edges of the side walls 9, 11, for example, in the form of bare metal wires. The auxiliary electrodes 16, 17 thus lie between the tips 13 and the counter electrode 4 or the web 3 advanced thereon with the surface 2 to be charged. The auxiliary electrodes 16, 17 are connected via a resistor 18 to the other pole, for example, the negative pole of the high-voltage d.c. source 15. This connection via the resistor 18 is shown schematically in FIG. 1 for the counter electrode 17 on the right only. In the practical embodiment of the charging bar 1, the other counter electrode 16 is also connected via the resistor 18 (or a resistor of its own) to the pertinent pole of the high-voltage d.c. source 15. Usually, the electrode 16 is electrically conductively connected to the electrode 17, for example, via an electric conductor 19 (FIG. 2) which bridges these two electrodes and may be arranged outside the counter electrode 4 and the web 3 within the body of the charging bar 1.

In a practical embodiment, the high-voltage d.c. source 15 can supply a direct voltage of 20 kV. The ohmic resistor 18 can have a value of, for example, 50 megohms. The aforementioned values are set in accordance with the geometrical relations, the material properties of the web 3 and the desired charge on the surface 2.

It is important that the tips 13 of the corona electrode do not project over the auxiliary electrodes 16, 17 with respect to the counter electrode 4, but lie preferably at a distance distinctly behind the auxiliary electrodes 16, 17 with respect to the counter electrode 4, because only thus, in conjunction with the grounding of the auxiliary electrodes 16, 17 by the resistor 18, with the development of a corresponding voltage drop, is a field distribution obtained, on the basis of which unipolar electrical charges with a desired sign (in the present case positive charges) reach the surface 2 of the advanced web 3 uniformly and continuously, and the structure of the corona electrode formed by the tips 13 thereby has a less disturbing effect on the charging picture.

In the embodiment illustrated in FIGS. 1 and 2, the corona electrode is formed by the tips 13 which are electrically connected to one another. In other embodiments, the tips 13 can also be replaced by an edge or a thin wire so long as electric corona discharges, which are directed towards the auxiliary electrodes 16, 17 and the counter electrode 4 and on the basis of which the unipolar electrical charges reach the surface 2 of the advanced web, form at these elements.

The auxiliary electrodes 16, 17 which, during operation of the device, on account of the voltage drop brought about by the resistor 18, are not connected to ground potential but to a potential between the latter and the voltage of the current source 15, can have such a relatively large curvature that a corona discharge cannot take place at these.

Figure 3:
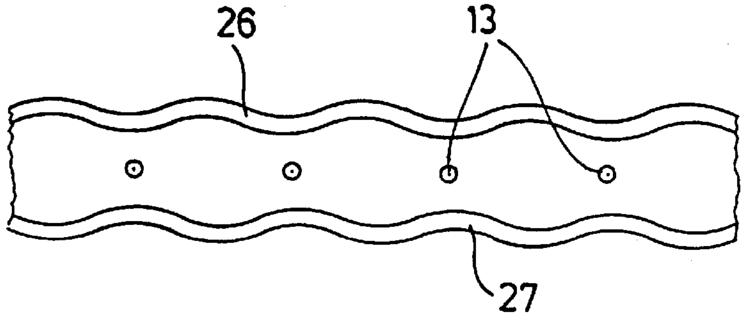
FIG. 3 schematically a plan view of a modified charging bar with auxiliary electrodes extending in meandering configuration.

FIG. 3 shows schematically in a plan view a modified embodiment of auxiliary electrodes 26, 27 which extend on both sides of the corona electrode which is again formed by tips 13. As is apparent from FIG. 3, the auxiliary electrodes 26, 27 do not extend in a straight line, but in meandering configuration, and, in the vicinity of the tip electrodes 13, the auxiliary electrodes 26, 27 are spaced at a shorter distance from these than in the area between the tip electrodes. In the manner apparent from FIG. 1, the auxiliary electrodes 26, 27 are again connected by a resistor 18 to the one pole of the high-voltage d.c. source 15. It has been found that with the meandering configuration of the auxiliary electrodes 26, 27 in accordance with FIG. 3, an improved field distribution at the charging bar 1 and a more uniform applying of the charge to the surface 2 are achievable.

The described device formed by the charging bar 1 can always be used in cases where unipolar electrical charges are to be applied to a moving, essentially electrically insulating surface. Examples of use are: printing machines in which webs of paper are guided over rollers acting as counter electrodes, applying unipolar electrical charges to plastic films or textile webs, in particular, to bond these surfaces to counter surfaces, for example, metal rollers acting as counter electrodes, for example, also to bond freshly extruded or blown plastic films to metal rollers, to laminate two or several plastic films or the like together.

Use of one or several auxiliary electrodes 16, 17, 26, 27 in addition to the actual corona electrode (tips 13) results in two separate fields transporting electrical charges, firstly, the corona field formed between the corona electrode and the auxiliary electrodes 16, 17; 26, 27, and, secondly, the diffusion field formed between the auxiliary electrodes 16, 17; 26, 27 and the surface 2 (counter electrode 4) and adjustable by the resistor 18. A stable, uniform charging operation with a high degree of efficiency is thereby made possible. A minimal flow of current to the auxiliary electrodes is adequate to keep the used current stable. Smaller spacings and, therefore, smaller high voltages can be employed with the described means.

Figure 4:
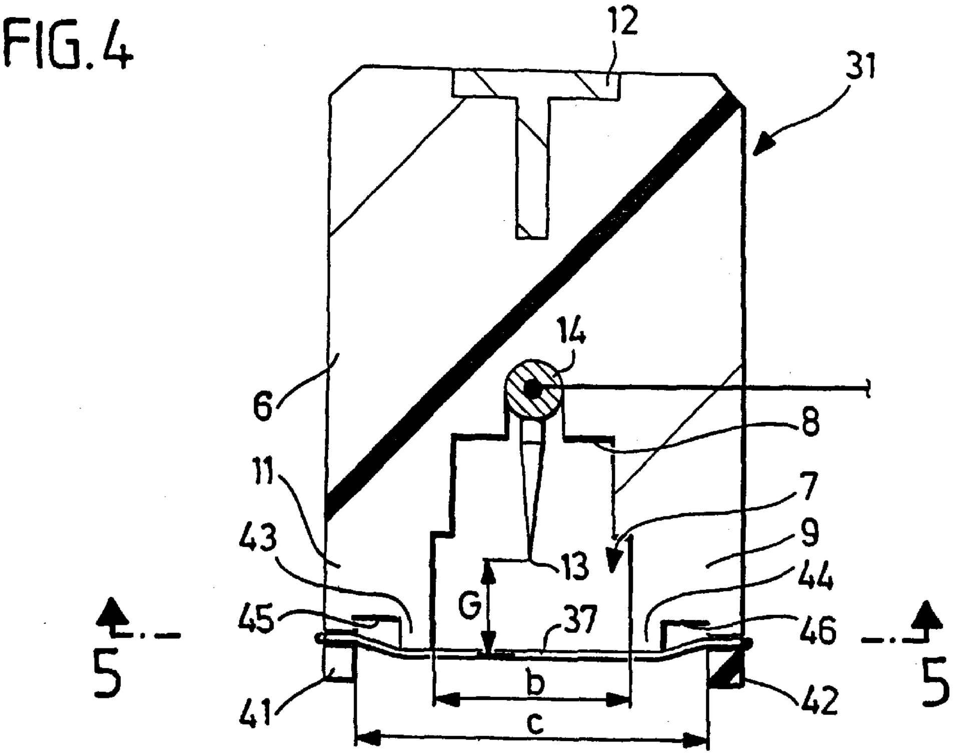
FIG. 4 a cross-sectional view similar to FIG. 1 of another modified embodiment of a charging bar.
Figure 5:
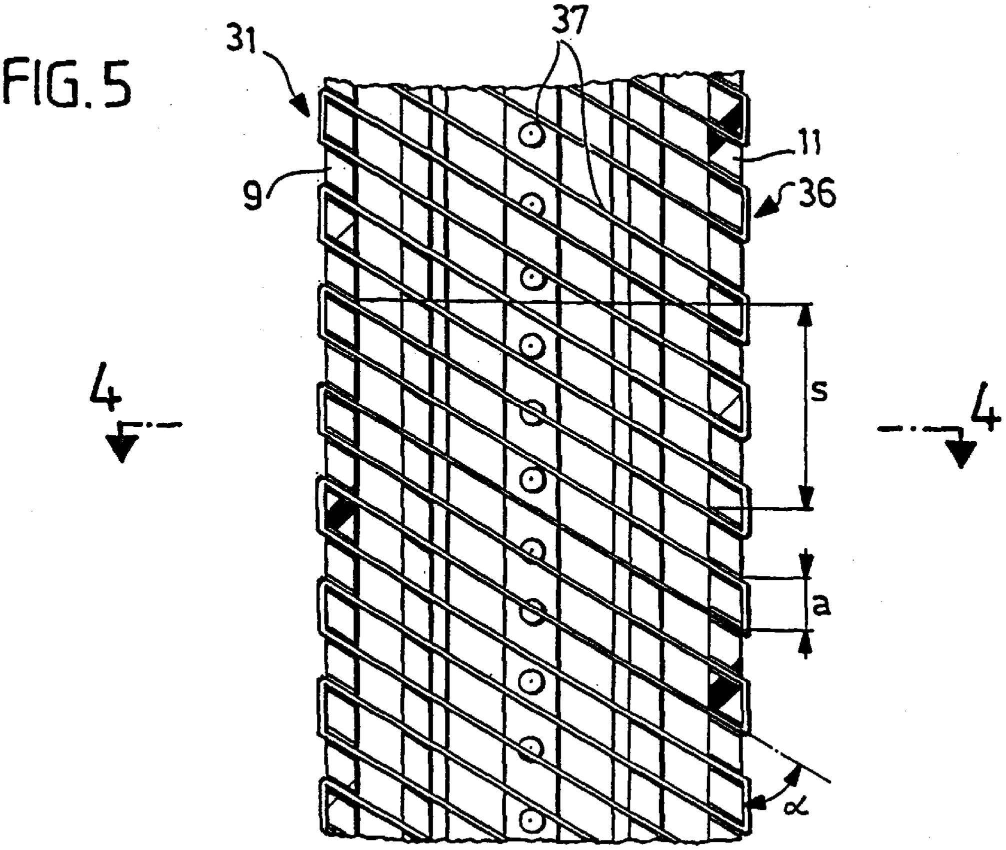
FIG. 5 a plan view of the charging bar from FIG. 4.

FIGS. 4 and 5 show an embodiment of a charging bar 31 which represents a modification of FIGS. 1, 2 and 3. Identical or corresponding parts of the charging bars 1 (FIGS. 1 to 3) and 31 (FIGS. 4 and 5) have identical reference numerals and are not described again. In FIG. 4, a counter electrode 4 which is connected to ground 5 and over which a web 3 with a surface 2 to be electrically charged is advanced in the direction of arrow A, is again to be imagined below the charging bar 31, as in FIG. 1.

The main difference between the two charging bars 1 and 31 lies in the design of their auxiliary electrodes. Whereas in the embodiment according to FIGS. 1 to 3, two auxiliary electrodes 16, 17 in the form of metal wires extending parallel to the longitudinal axis of the charging bar 1 are arranged at the free edges of the side walls 9 and 11, the auxiliary electrode 36 in the embodiment according to FIGS. 4 and 5 is in the form of a wire grating made of thinnest possible wire spanning the side walls 9 and 11. The wire sections 37 forming the wire grating extend between the side walls 9 and 11 at an incline to the longitudinal axis of the charging bar 31.

The wire grating forming the auxiliary electrode 36 is mounted in the following way: As is best apparent from FIG. 4, cuts are made from above in the side walls 9 and 11 so they have the cross-sectional shape shown in FIG. 4 and outer webs or cheeks 41, 42 and inner webs or cheeks 43, 44 separated from one another by grooves 45, 46 are thereby produced. The inner cheeks 43, 44 are shorter than the outer cheeks 41, 42. The outer cheeks 41, 42 have slots extending at an incline to the longitudinal axis of the charging bar 31. In FIG. 4, these open in the downward direction, in FIG. 5 in the upward direction perpendicularly to the drawing plane. At their closed ends, the inclined slots preferably terminate in bores, the diameters of which are somewhat larger than the width of the slots, which produces keyhole-like recesses into which a continuous wire forming the individual inclined wire sections 37 can be placed. This results in the uniform wire grating which is best apparent from FIG. 5. As FIG. 4 shows, the wire sections 37 rest on both sides of the channel 7 on the inner cheeks 43, 44, which act as supporting shoulders. The aforementioned bores which delimit the keyhole-like slots lie, as is apparent from FIG. 4, somewhat above the free ends of the cheeks 43, 44, so the wire sections extend somewhat at an incline in the downward direction between the cheeks 41, 43 and 42, 44. With appropriate tensioning of the wire forming the wire sections 37, the individual wire sections are thus reliably held in a plane defined by the free ends of the cheeks 43, 44.

Like those of FIG. 1, the corona electrode consisting of the tips 13 and the wire 14 as well as the auxiliary electrode 36 are connected to a high-voltage d.c. source 15 (in a manner not illustrated), and a resistor 18 is connected between the wire grating-type auxiliary electrode 36 and the voltage source.

The spacings between the individual wire sections 37 are designated by the letter a. The distance measured along the inner sides of the side walls 9, 11 over which a wire section 37 extends at an incline is designated in FIG. 5 by the letter s. The letter b designates in FIG. 4 the spacing between the inner sides of the two inner cheeks 43, 44, while the letter c indicates the clear width between the inner sides of the outer cheeks 41, 42. The spacing of the tips 13 from the plane in which the wire sections 37 forming the auxiliary electrode 36 extend is designated by the letter G in FIG. 4.

In particular, the embodiment of the charging bar 31 according to FIGS. 4 and 5 is advantageous when charging of the surface 2 of the web 3 is required without the formation of stripes in the longitudinal direction of the web. For, in this case, the structures caused by the inhomogeneity of the corona electrode, for example, by the individual tips 13, must be eliminated as fully as possible, which is achieved by the wire sections 37 extending at an incline to the longitudinal extent of the charging bar 31 and hence also at an incline to the direction of advance A of the web 3. It is particularly effective to make the wire grating forming the auxiliary electrode 36 from wire which is as thin as possible, and, if possible, from noncorrosive material, for example, stainless steel, so the grating is not corroded by discharge processes which take place.

The following conditions have proven expedient for the formation of the wire grating-type auxiliary electrode 36:

1. The distance G of the wire grating from the corona electrode accommodated in the bottom wall 8 of the channel 7, i.e., for example, in the case of the tips 13, the distance between the wire grating and these tips, or, in the case of wire-type corona electrodes, the distance between wire surface and wire grating, should be larger or at least equal to the distance between the grating-type auxiliary electrode 36 and the counter electrode 4 (FIG. 1).
2. The wire sections 37 forming the wire grating should lie as exactly as possible in a plane parallel to the plane of the counter electrode 4.
3. An identical number of wire sections 37 per unit of length of the charging bar 31 should be effective over the entire actual length of the bar.

The first condition can be readily fulfilled by corresponding arrangement of the counter electrode 4.

The second condition is met by the resting of the wire sections 37 on the upper sides of the inner cheeks 43, 44 of identical height. The guidance and tensioning of the wire forming the wire sections 37 by the aforementioned keyhole-type slots in the outer cheeks 41, 42 result in setting of the individual wire sections 37 in one plane, with the wire sections 37 each including an acute angle α with the longitudinal axis of the charging bar 31. The aforementioned keyhole-type extensions of the slots accommodating the wire sections 37 at the ends thereof also enable the wire sections 37 to interlock with and thus be supported on the side walls 9, 11.

The third condition can be met by the following relationship:

(s/c):(b/a)=(I), wherein I=1, 2, 3 . . .

applying to the dimensions s (=distance between two fixing points of a wire section 37 on the inside walls 9 and 11), c (=inside dimension between the outer cheeks 41, 42), b (=width of the central channel 7) and a (=distance between two adjacent wire sections 37).

tg(α)=s/c applies to the angle α which the wire sections 37 form with the axis of the charging bar 31.

I: tg(α)=b/a applies to the wire section 37 lying freely over the central channel 7.

This results in the condition first indicated above.

With a charging bar 31 of the kind illustrated in FIGS. 4 and 5, when a high voltage which is not too great is applied, a corona current flows from the corona electrode (tips 13) to the wire grating-type auxiliary electrode 36. The auxiliary electrode 36 is biased with respect to the counter electrode 4 due to the voltage drop across the resistor 18 (cf. FIG. 1) connected between auxiliary electrode 36 and voltage source 15. On account of the breakthrough effect through the wire grating of the auxiliary electrode 36, a charge carrier current flows to the counter electrode 4. By increasing the voltage, at a certain operating point the grating of the auxiliary electrode 36 is then biased to such an extent with respect to the counter electrode 4 that the corona breakthrough voltage at the wire sections 37 is exceeded and a stable discharge fed by the corona electrode develops between grating and counter electrode.

For certain applications it may prove expedient to divide the corona electrode arranged in the bottom wall 8 of the channel 7 into individual sections which are connected to various high-voltage sources with different voltages. By corresponding relative setting of the individual voltages, so-called "edge effects", i.e., different electrical charges in the area of the outer side edges of the surface 2 to be charged are thereby achievable.

Figure 6:
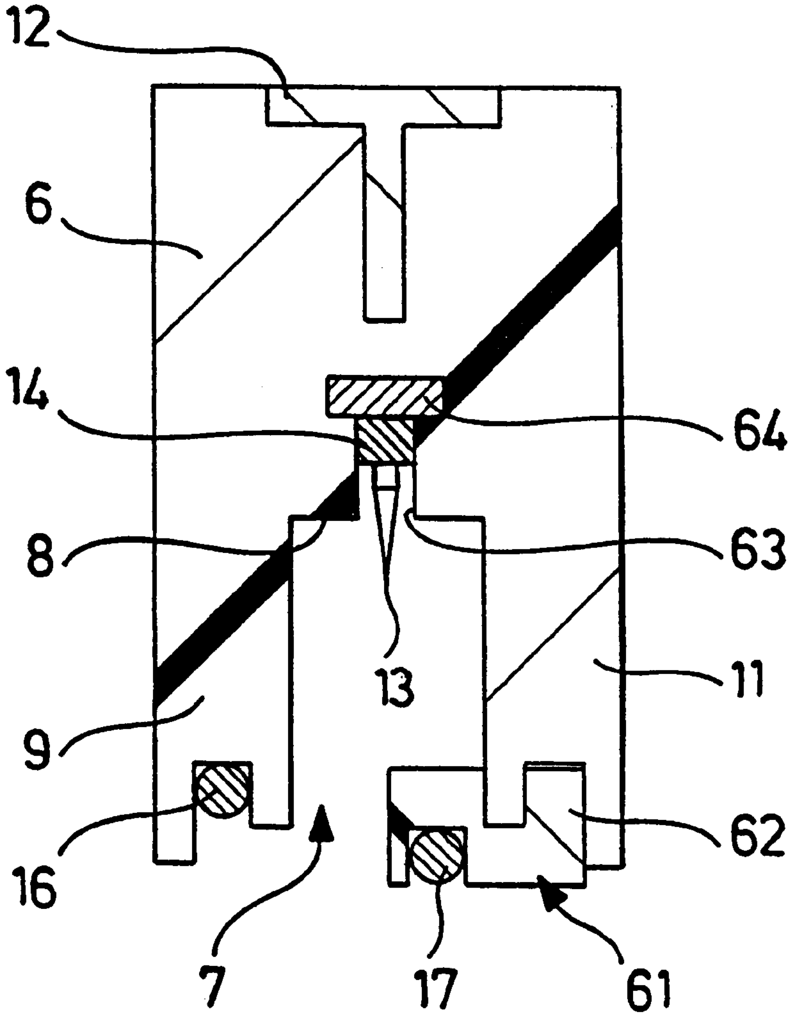
FIG. 6 a view similar to FIG. 1 of a further embodiment.

The further embodiment of an inventive device illustrated in FIG. 6 corresponds in its basic design substantially to the device according to FIG. 1. Parts corresponding to one another have the same reference numerals in FIGS. 1 and 6.

The main difference between the embodiments according to FIGS. 1 and 6 is that in FIG. 1 the channel 7 is completely open in the outward direction, whereas in FIG. 6 it is partly closed by a strip 61 consisting of electrically insulating material. The strip 61 extends over the full longitudinal extent, oriented perpendicular to the drawing plane in FIG. 6, of the carrier 6 forming the charging bar. In the embodiment illustrated in FIG. 6, approximately half of the channel 7 is covered by the strip 61. However, the strip 61 could also extend with its free end further or less far over the channel 7 than is illustrated in FIG. 6.

The profile of the strip 61 placed on the free end of the side wall 11 is formed such that a leg 62 of the strip 61 fits into that recess which in FIG. 1 accommodates the auxiliary electrode 17. The auxiliary electrode 17 is inserted in a corresponding recess in the strip 61 at its end facing away from the leg 62.

The partial closure of the channel 7 by the strip 61 has the following advantage: As already stated, in the electric charging of advanced workpiece webs 3 (cf. FIGS. 1 and 2) there is the danger that the pattern of the tips 13 forming the corona electrodes will be reproduced in the form of stripes on the surface of the web 3. This is prevented by the strip 61 which screens the corona electrodes formed by the tips 13 to such an extent that these can no longer be reproduced in the form of stripes on the advancing web 3.

In other respects, the means according to FIG. 6 acts and operates exactly as in that previously described, in particular, in conjunction with FIGS. 1 and 2. In particular, it is also connected in the same way as in FIG. 1 to the voltage source 15.

It has been found that the tips 13 of the corona electrodes wear particularly easily on account of the described electrode arrangement and circuitry, and so it is necessary for the corona electrodes formed by the tips 13 to be replaced by new corona electrodes. This may apply to all of the embodiments of inventive devices described herein.

To enable such replacement, the wire-shaped conductor 14 to which the tips 13 are attached is given a square cross section so it can be inserted in a positively connected manner into the groove 63 at the bottom 8 of the channel 7 (cf. FIG. 6). The wire-shaped conductor 14 consists of magnetizable material, for example, of steel. On one side of the wire-shaped conductor 14 permanent-magnetic elements 64, for example, in the form of individual blocks inserted at mutual spacings from one another, but, possibly also in the form of a continuous strip, are inserted in the carrier 6 made of electrically insulating plastic. The wire-shaped conductor 14 with its tips 13 is held securely in place by these permanent-magnetic elements 64. However, if required, the conductor 14 can be readily released from the permanent-magnetic elements 64 by applying a corresponding pulling force.

It is expedient to arrange the strip 61 such that it is also exchangeable, for example, attachable to the free edge of the side wall 11. After removal of the strip 61 with the auxiliary electrode 17, the full width of the channel 7 is available for removal of the wire-shaped conductor 14 with the tips 13 attached thereto. After replacement of this part, the strip 61 is secured on the free edge of the side wall 11 again.

It will be understood that the strip 61 could also be arranged in a corresponding manner on the free edge of the side wall 9. In principle, the section of the strip 61 covering the channel 7 and carrying the electrode 16 or 17 could also be firmly connected to the appropriate side wall 9 or 11 to thereby form one part therewith.

What is claimed is:

1. A device for applying unipolar electrical charges to moving, essentially electrically insulating surfaces supported on an electrically conductive counter electrode, said device comprising:

a carrier made of electrically insulating material in the form of a channel with a bottom wall and two side walls, with free edges of said side walls facing said counter electrode;

an elongated corona electrode comprising a plurality of tips, said elongated corona electrode being arranged in said channel and at said bottom wall without said tips projecting over the free edges of said side walls;

at least one auxiliary electrode arranged at or in the vicinity of each of the free edges of said side walls between said elongated corona electrode and said counter electrode;

said elongated corona electrode being adapted for connection to a first pole of a high-voltage d.c. source;

and said counter electrode and said at least one auxiliary electrode being adapted for connection to a second pole of said high-voltage d.c. source, with an ohmic resistor coupled in series with said second pole and said at least one auxiliary electrode;

said elongated corona electrode being arranged at a distance beyond said at least one auxiliary electrode when viewed from said counter electrode; and said at least one auxiliary electrode having:

(a) a first surface section directed toward said elongated corona electrode;

said first surface section being covered by an insulating material; and (b) a second surface section directed toward said counter electrode; wherein:

said second surface section is uncovered.

2. A device as defined in claim 1, wherein said corona electrode comprises a plurality of tip electrodes, and said auxiliary electrodes are closer to each other in the vicinity of said tip electrodes than in areas between said tip electrodes.

3. A device as defined in claim 1, wherein said auxiliary electrode is designed as a wire grating spanning said side walls.

4. A device as defined in claim 3, wherein wire sections forming said wire grating extend at an incline to a longitudinal axis of said carrier.

5. A device as defined in claim 4, wherein:

said wire sections are set in one plane by being supported at both sides on respective cheeks; and said respective cheeks are arranged at respective distances beyond said side walls when viewed from said elongated corona electrode.

6. A device as defined in claim 3, wherein:

wire sections forming said wire grating are set in one plane by being supported at both sides on respective cheeks; and said respective cheeks are arranged at respective distances beyond said side walls when viewed from said elongated corona electrode.

7. A device as defined in claim 1, wherein said corona electrode is held firmly in said carrier by permanent-magnetic elements.

8. A device as defined in claim 7, wherein said corona electrode comprises a wire-shaped conductor of square cross section consisting of magnetic material and having tips protruding therefrom, said wire-shaped conductor being removably insertable in a groove of said carrier for firm mounting via said permanent-magnetic elements.

9. The device as defined in claim 1, wherein:

a pair of said auxiliary electrodes is provided at or in the vicinity of each of the free edges of said side walls between said elongated corona electrode and said counter electrode; and said auxiliary electrodes are provided on either side of said elongated corona electrode.

10. A device for applying unipolar electrical charges to moving, essentially electrical insulating surfaces comprising:

an electrically conductive counter electrode supporting said insulating surfaces;

a carrier made of electrically insulating material, said carrier comprising a channel formed by a bottom wall and two side walls, said side walls having free edges facing said counter electrode;

a strip of electrically insulating material provided on the free edge of one of said side walls, said strip partially covering said channel;

a corona electrode arranged in said channel and at said bottom wall without projecting over said free edges of said side walls;

at least one auxiliary electrode arranged between said corona electrode and said counter electrode and on a side of said strip facing away from said corona electrode and in a free edge region of said strip;

at least one auxiliary electrode arranged at or in the vicinity of the free edge of another of said side walls between said corona electrode and said counter electrode;

said auxiliary electrodes being arranged such that when viewed from said counter electrode, said corona electrode is arranged at a distance beyond said auxiliary electrodes; and a high voltage d.c. source having one pole connected to said corona electrode and another pole connected to said counter electrode and via an ohmic resistor to said auxiliary electrode.

11. A device as defined in claim 10, wherein said corona electrode comprises a tip electrode.

12. A device as defined in claim 10, wherein corona electrode comprises an edge.

13. A device as defined in claim 10, wherein said corona electrode comprises a wire.

14. A device as defined in claim 10, wherein said corona electrode is held firmly in said carrier by permanent-magnetic elements.

15. A device as defined in claim 14, wherein said corona electrode comprises a wire-shaped conductor of square cross section consisting of a magnetic material and having tips protruding therefrom, said conductor being exchangeably inserted in a groove of said carrier and held firmly by said permanent-magnetic elements.

* * * * *